United States Patent [19]

Schneider et al.

[11] 4,090,262
[45] May 16, 1978

[54] MIXING AND PROPORTIONING APPARATUS FOR MULTI-COMPONENT PLASTICS MATERIALS

[75] Inventors: Fritz W. Schneider, Strasslach; Ivica Grgic, Munich, both of Germany

[73] Assignee: Elastogran Maschinenbau GmbH & Co., Strasslach, Germany

[21] Appl. No.: 695,244

[22] Filed: Jun. 11, 1976

[30] Foreign Application Priority Data

Jun. 12, 1975 Germany ............................. 2526215

[51] Int. Cl.² ..................... B01F 15/04; B01F 15/14
[52] U.S. Cl. ..................................... 366/155; 366/162
[58] Field of Search ............. 259/4 R, 7, 8, 4 A, 259/4 AB, 4 AC, 5, 6, 23, 24, 21, 95, 43, 44, 40, 41

[56] References Cited

U.S. PATENT DOCUMENTS

| | | |
|---|---|---|
| 2,788,953 | 4/1957 | Schneider ............................ 259/4 R |
| 2,847,196 | 8/1958 | Franklin ................................... 259/8 |
| 3,045,985 | 7/1962 | Rock ..................................... 259/4 R |
| 3,265,365 | 8/1966 | Ward ........................................ 259/8 |
| 3,547,409 | 12/1970 | Jacuzzi ................................. 259/4 R |
| 3,888,465 | 6/1975 | Terwilliger .......................... 259/4 R |

Primary Examiner—Robert W. Jenkins
Attorney, Agent, or Firm—H. Dale Palmatier

[57] ABSTRACT

A mixing and proportioning apparatus for multi-component plastics materials such as polyurethane comprises a number of tanks, a mixing chamber and a separate pipe connecting each tank to the mixing chamber. The tanks are provided with pressurizing means for causing the components to flow through the pipes and each pipe is provided with a metering mechanism to control the flow of the component through it. The metering mechanisms of the different pipes are all positively coupled to each other so that the rates of flow of the components through the pipes are all kept in constant proportions.

2 Claims, 4 Drawing Figures

U.S.Patent May 16, 1978 4,090,262
Fig.1
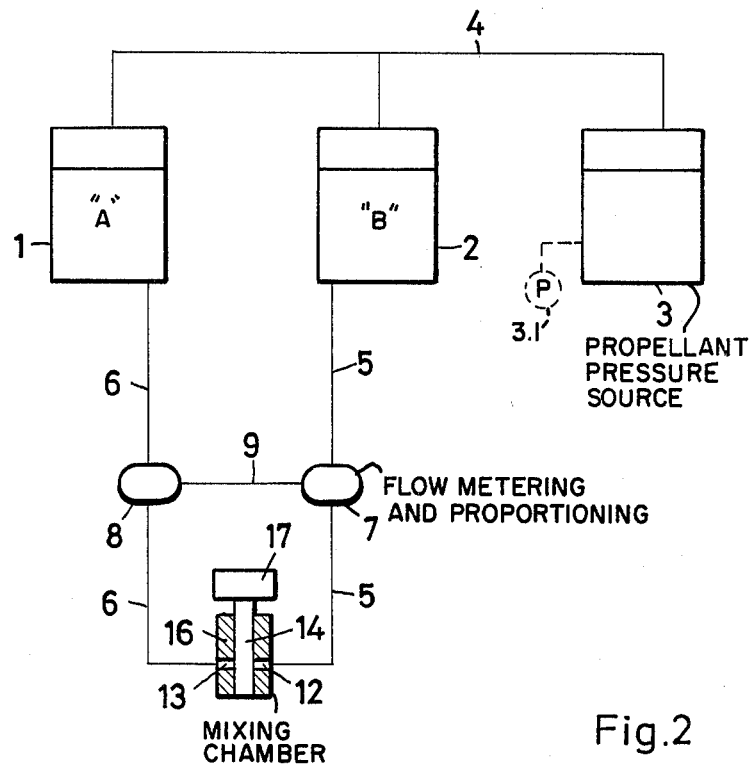
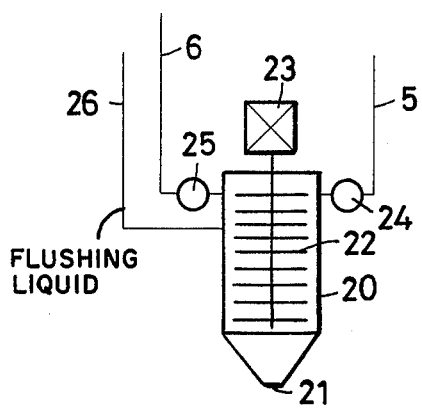
Fig.3
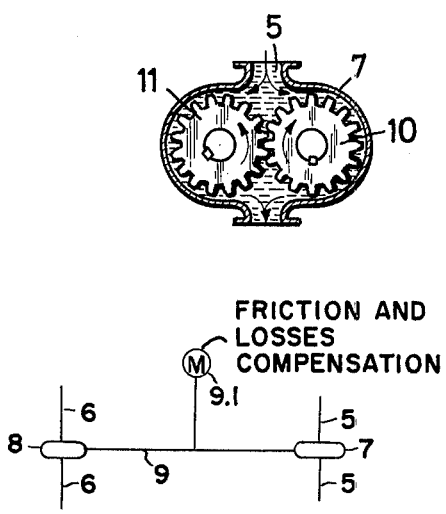
Fig.2
Fig.4

MIXING AND PROPORTIONING APPARATUS FOR MULTI-COMPONENT PLASTICS MATERIALS

This invention relates to mixing and proportioning apparatus for multi-component plastics materials, especially polyurethane, the apparatus including a tank for each component and each tank being connected by a pipe to a mixing chamber.

Known apparatus of the above-mentioned kind is provided with a pump in each pipe, each pump having a separate drive. On this account the apparatus is relatively heavy and bulky. If such apparatus is used for spraying, i.e., for coating surfaces, the mixing chamber is provided in a spray gun and the pipes are relatively long. These pipes or hoses extend from the spray gun to the pumps and tanks which are stationary. The range of action of such apparatus is limited. Furthermore because of the provision of a number of pumps and drives for the pumps, the apparatus is relatively expensive.

The object of the present invention is to provide a mixing and proportioning device of the above-mentioned type, which can be made light and portable, that is to say so that the whole of the apparatus inclusive of the tanks and the mixing chamber is portable.

To this end, according to this invention, in apparatus for mixing and proportioning multi-component plastics materials comprising a number of tanks one for each component, and a pipe connecting each tank to a mixing chamber, we provide means for applying pressure to the components in the tanks and each pipe is provided with a metering mechanism for metering the flow of the component through it, the metering mechanisms being positively coupled to each other to keep the rates of flow of the components through the pipes in constant proportions.

With the apparatus in accordance with the invention, the relatively costly and heavy pumps together with their drives are no longer required. Because the components are held under pressure in the tanks, conveyance to the mixing chamber is effected by this pressure. The metering mechanisms in the pipes from the tanks to the mixing chamber merely ensure that the required amounts of the components always flow to the mixing chamber. By means of the positive coupling it is ensured that the required ratio in the mix is always maintained in the mixing chamber. The apparatus in accordance with the invention can be made light and may be produced as a compact unit so that it can, for example, be carried on a frame by an operator. Limitation of the range of action of the apparatus by the lengths of hose does not therefore occur.

Under some circumstances it is advantageous to provide for the positively coupled metering mechanisms a drive which serves to overcome frictional forces and other losses in the mechanisms and only needs to be switched on when the mixing chamber is opened. This drive is not for conveyance of the component as in the case of a pump, but is merely a relatively small regulating or auxiliary drive.

The metering mechanisms may be in the form of gear-pumps but with the rotation of the gear wheels being effected by the flow of the components under pressure and not by a separate drive. One gear wheel of each pump is then positively coupled to a gear wheel of each of the other pumps so that the gears of all the pumps make an equal number of revolutions to provide equal or constantly proportioned discharges of the various components according to the sizes of the pumps. The ratio of the components once set at the input into the mixing chamber is therefore maintained.

It is also possible to use other metering mechanisms operating volumetrically, e.g., piston pumps or the like.

The pressure in the tanks may be generated in various ways. For example, it is possible to provide a tank with a drive which generates the pressure and this tank is then connected to the tanks for the components. It is alternatively possible to connect a compressed air bottle to the component tanks to provide the necessary supply pressure.

The mixing chamber may be constructed as a high-pressure or as a low-pressure mixing chamber. Such mixing chambers are conventional.

Two examples of apparatus in accordance with the invention will now be described with reference to the accompanying drawings, in which:

FIG. 1 is a diagrammatic elevation of one example;

FIG. 2 is a section through an example of a metering mechanism which forms a part of the apparatus shown in FIG. 1; and, FIG. 3 is a diagrammatic elevation of part of a second example of the apparatus, namely a low-pressure mixing chamber with a mixing mechanism having mechanical positive cleaning.

FIG. 4 is a detail diagrammatic view of an alternate embodiment of the invention.

The apparatus shown in FIG. 1 includes two tanks 1 and 2 for two components A and B of a plastics material. The tanks 1 and 2 are connected via a pipe 4 to a pressurising tank 3 providing a propellant pressure source which may either contain a drive in the form of a compressor or air pump 3.1 (shown as an alternative form in dotted lines) or may be a compressed air bottle.

For feeding the components from the tanks 1 and 2, pipes 5 and 6 are provided which lead to input openings 12 and 13 of a high-pressure mixing chamber 16. In the pipes 5 and 6 are metering mechanisms 7 and 8 respectively. These metering mechanisms are coupled together positively at 9 in order to ensure that, irrespective of the pressures in the tanks 1 and 2, equal amounts, or amounts in constant proportions, of the components are fed.

In the mixing chamber 16 a cleaning and control piston 14 is movable to and fro by a hydraulic mechanism 17. In the position illustrated in the drawing the piston 14 closes the input openings 12 and 13. If the piston is retracted by the hydraulic mechanism 17, the components enter the mixing chamber through the input openings 12 and 13.

The metering mechanisms 7 and 8 may be constructed as illustrated in FIG. 2. The construction corresponds with that of a gear-pump but with the driving mechanism omitted. Each of the metering mechanisms has reacting means or gears 10, 11 which respond to passage of the component therethrough to meter the quantity or rate of flow of the component, and which also restrict or limit flow of the component. Instead of the driving mechanism, one gear wheel 10 of each pump is coupled to the corresponding gear wheel of the other pump by a shaft 9. In this way it is ensured that the components are fed through the metering mechanisms 7 and 8 in the correct proportions, which are equal if the mechanisms are identical.

Instead of the mixing chamber 16, a low-pressure mixing chamber 20 with a stirrer 22 and stirrer drive 23 as shown in FIG. 3 may be provided. The mixed components flow from an outlet 21.

Valves 24 and 25 which are opened and closed simultaneously allow the input of the components under pressure through the pipes 5 and 6 to take place when the valves are open and prevent the input when closed. In this example also positively coupled metering mechanisms are provided in the pipes 5 and 6. A pipe 26 is provided for the inlet of flushing liquid for cleaning, since in the case of this low-pressure mixing chamber with a stirrer, positive cleaning, as by the piston 14 of the example in FIG. 1, is not possible.

The apparatus in accordance with the invention can be made so that it is compact and light so that it may be carried by one person, for example on the back, to any place and there brought into use. This is in particular due to costly and heavy pumps and corresponding driving mechanisms being omitted.

Instead of a high or low pressure mixer a static mixer may also be used. Various different types of such mixers are known.

Of course the invention is not restricted to tanks for only two components. Depending upon the number of components to be used, a corresponding number of metering mechanisms are positively coupled to each other.

Fundamentally it is also possible to connect the mixing and proportioning apparatus to existing stationary tanks with ring delivery pipes. In this case the far-ranging mobility of the apparatus is restricted but the apparatus itself is light and handy, so that in the connected state it may be used correspondingly easily. Furthermore it can easily be disconnected from the ring pipe system and then be reconnected to the system at another point.

In the alternative form of FIG. 4, the metering mechanisms 7, 8 may be provided with a small electric motor 9.1 only large enough to offset friction and other mechanical losses in the apparatus, but still allowing the principal impetus for the metering mechanisms to be provided by the flow of components from the pressurized tanks.

We claim:

1. In a mixing and proportioning apparatus for multicomponent plastics materials, said apparatus comprising a plurality of pressure tight tanks, one for each component, a mixing chamber and a plurality of pipes, one pipe connecting each of said tanks to said mixing chamber, the improvement comprising said apparatus being light and portable, means for applying pressure to said components in said tanks and causing flow of each of the components through a respective pipe and to the mixing chamber, and a plurality of mechanical metering mechanisms each being operatively fitted in a respective pipe and continuously allowing flow of component in the entire pipe from the tank to the mixing chamber, and each including a gear pump having a first gear wheel and a second gear wheel meshing with said first gear wheel, said gear pumps in the respective pipes continuously turning as motors under the influence of the flowing components and allowing flow of the components therethrough to continuously meter passage of the components, and said gear pumps also, while turning as motors, limiting rate of flow of the components therethrough, and shaft means positively mechanically coupling the first gear wheels of both of said gear pumps to each other to continuously proportion the flow of said components to the mixing chamber.

2. In a mixing and proportioning apparatus for multicomponent plastics materials, said apparatus comprising a plurality of pressure tight tanks, one for each component, a mixing chamber and a plurality of pipes, one pipe connecting each of said tanks to said mixing chamber, the improvement comprising means for applying pressure to said components through a respective pipe and to the mixing chamber, and a plurality of mechanical metering mechanisms each being operatively fitted in a respective pipe and continuously allowing flow of component in the entire pipe from the tank to the mixing chamber, and each including a gear pump having a first gear wheel and a second gear wheel meshing with said first gear wheel, said gear pumps in the respective pipes turning as motors under the influence of and allowing flow of the component therethrough to meter passage of the component, and said gear pumps also, while turning as motors, limiting rate of flow of the components therethrough, shaft means positively mechanically coupling the first gear wheels of both of said gear pumps to each other to continuously proportion the flow of said components to the mixing chamber, and a motor operatively connected to both gear pumps and supplying mechanical power into said gear pumps to offset friction and other mechanical losses.

* * * * *